United States Patent
Lee

(10) Patent No.: US 12,425,826 B2
(45) Date of Patent: Sep. 23, 2025

(54) METHOD FOR TRIGGERING ADVANCED AUTOMATIC COLLISION NOTIFICATION USING PRE-CRASH SYSTEM

(71) Applicant: LG Electronics Inc., Seoul (KR)

(72) Inventor: Ki-Dong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 453 days.

(21) Appl. No.: 17/801,011

(22) PCT Filed: Feb. 17, 2021

(86) PCT No.: PCT/KR2021/002001
§ 371 (c)(1),
(2) Date: Aug. 19, 2022

(87) PCT Pub. No.: WO2021/167335
PCT Pub. Date: Aug. 26, 2021

(65) Prior Publication Data
US 2023/0105583 A1    Apr. 6, 2023

Related U.S. Application Data

(60) Provisional application No. 62/980,434, filed on Feb. 23, 2020.

(51) Int. Cl.
*H04W 4/90* (2018.01)
*G08G 1/16* (2006.01)
*H04W 4/40* (2018.01)

(52) U.S. Cl.
CPC .............. *H04W 4/90* (2018.02); *G08G 1/164* (2013.01); *H04W 4/40* (2018.02)

(58) Field of Classification Search
CPC .................. H04W 4/90; H04W 4/40
(Continued)

(56) References Cited

U.S. PATENT DOCUMENTS 8,116,723 B2 * 2/2012 Kaltsukis ............ H04L 65/1069
455/403
9,020,690 B2 * 4/2015 McKown ............. G08B 25/001
701/33.7

(Continued)

FOREIGN PATENT DOCUMENTS

KR    20160061647    6/2016

OTHER PUBLICATIONS

3GPP TS 26.267 V15.0.0 (Jun. 2018), "3rd Generation Partnership Project; Technical Specification Group Services and System Aspects; eCall Data Transfer; In-band modem solution; General description (Release 15)," Jun. 2018, 36 pages.

*Primary Examiner* — Qutbuddin Ghulamali
(74) *Attorney, Agent, or Firm* — Fish & Richardson P.C.

(57) ABSTRACT

A method and apparatus for triggering advanced automatic collision notification (AACN) using learning-based pre-crash system in a wireless communication system is provided. A user equipment obtains inputs from a pre-crash system (PCS) sensing function (PCSSF) in the user equipment, initiates a pre-emergency call procedure upon receiving, from the PCSSF, a PCS sensing indication informing that an accident has been estimated to happen based on the obtained inputs, transmits, to a network, a minimum set of data (MSD) in the pre-emergency call procedure. The UE checks whether the accident happens for a time window and transmits, to the network, a report based on whether the accident has happened or not.

11 Claims, 15 Drawing Sheets

(58) Field of Classification Search
USPC .................................................. 455/404.1
See application file for complete search history.

(56) References Cited

U.S. PATENT DOCUMENTS

| | | | |
|---|---|---|---|
| 10,375,512 B2* | 8/2019 | Marko | H04W 4/029 |
| 2006/0025897 A1* | 2/2006 | Shostak | G06K 19/0717 |
| | | | 701/1 |
| 2017/0072851 A1* | 3/2017 | Shenoy | G08G 1/096775 |
| 2017/0251346 A1* | 8/2017 | Lee | H04W 4/90 |
| 2019/0037451 A1* | 1/2019 | Chaponniere | H04W 76/38 |
| 2019/0325288 A1* | 10/2019 | Oyenan | G06N 3/006 |

* cited by examiner

METHOD FOR TRIGGERING ADVANCED AUTOMATIC COLLISION NOTIFICATION USING PRE-CRASH SYSTEM

CROSS-REFERENCE TO RELATED APPLICATIONS

This application is a National Stage application under 35 U.S.C. § 371 of International Application No. PCT/KR2021/002001, filed on Feb. 17, 2021, which claims the benefit of U.S. Provisional Application No. 62/980,434, filed on Feb. 23, 2020. The disclosures of the prior applications are incorporated by reference in their entirety.

TECHNICAL FIELD

The present disclosure relates to an efficient method for triggering advanced automatic collision notification (AACN) using learning-based pre-crash system in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Emergency call (eCall) refers to an interoperable in-vehicle emergency call service which is envisioned to be introduced and operated across Europe in 2014. According to reports from the European Commission, it is foreseen that eCall will be offered on all new vehicles in the EU by 2014.

SUMMARY

The eCall cannot perform intended function if a failure of the corresponding eCall module deployed in the vehicle occurs. This problem should be addressed.

In an aspect, a method performed by a user equipment operating in a wireless communication system is provided. The method includes obtaining inputs from a pre-crash system (PCS) sensing function (PCSSF) in the user equipment, initiating a pre-emergency call procedure upon receiving, from the PCSSF, a PCS sensing indication informing that an accident has been estimated to happen based on the obtained inputs, transmitting, to a network, a minimum set of data (MSD) in the pre-emergency call procedure, checking whether the accident happens for a time window, and transmitting, to the network, a report based on whether the accident has happened or not.

In another aspect, an apparatus for implementing the above method is provided.

The present disclosure may have various advantageous effects.

For example, the MSD and/or supplementary information can be reliably delivered to the PSAP during partial/full failure of the eCall module.

For example, a precursory indication can be indicated in case of service robots.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
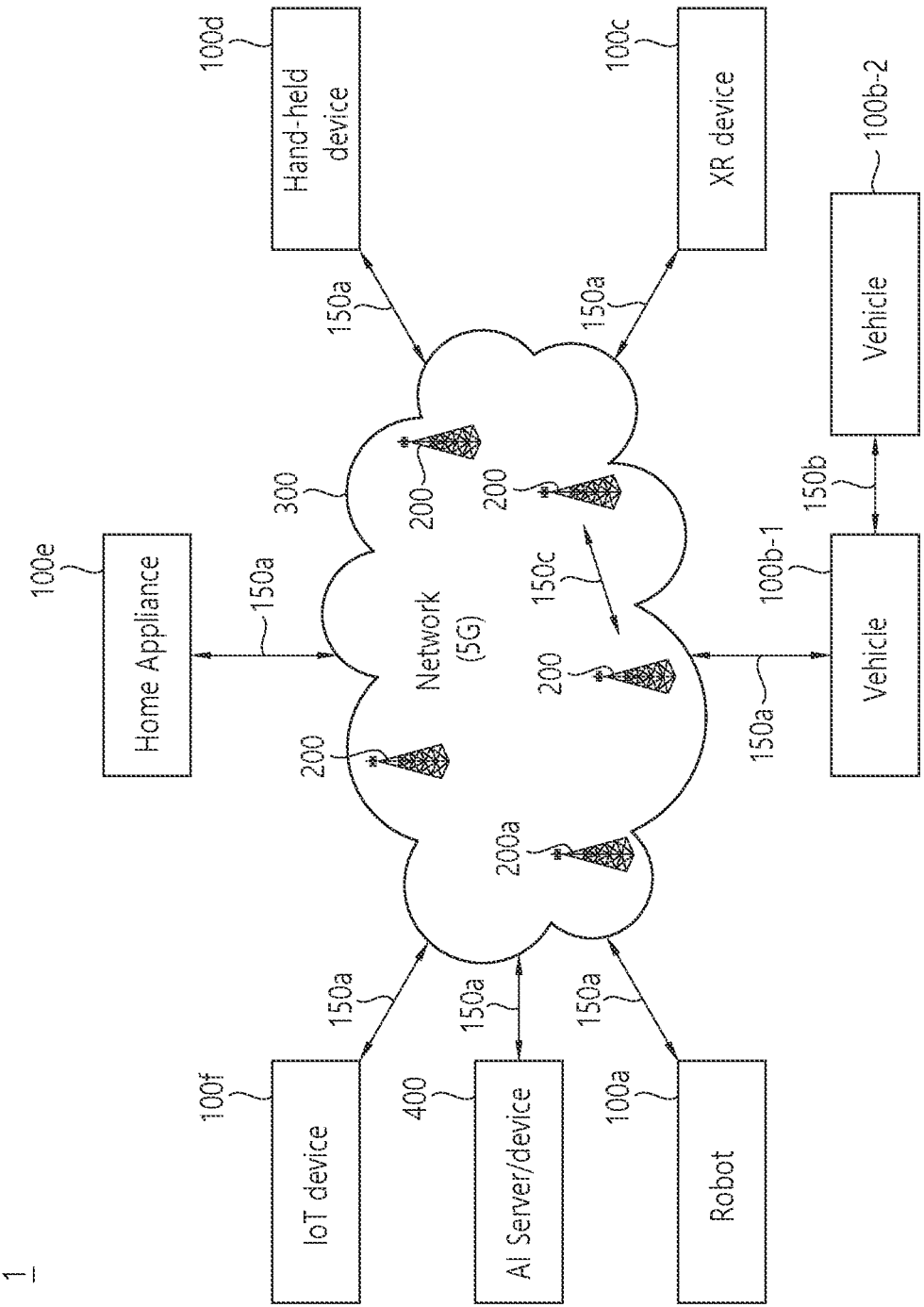
FIG. 1 shows an example of a communication system to which implementations of the present disclosure is applied.

The following techniques, apparatuses, and systems may be applied to a variety of wireless multiple access systems.

Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS), 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G new radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "bath A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smart-glasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication between devices without any intermediate node (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATS (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed hands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0 in Rel-12, 2) LTE Cat M1 in Rel-13, 3) LTE Cat M2 in Rel-14, 4) LTE non-bandwidth limited (non-BL) in Rel-14, 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
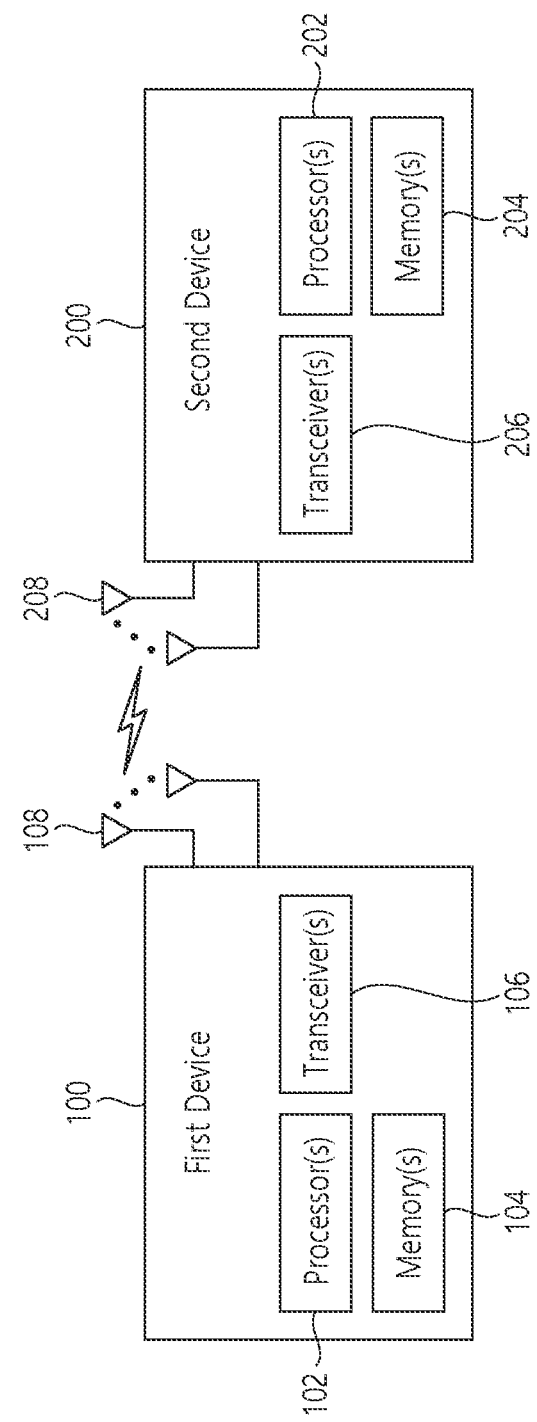
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
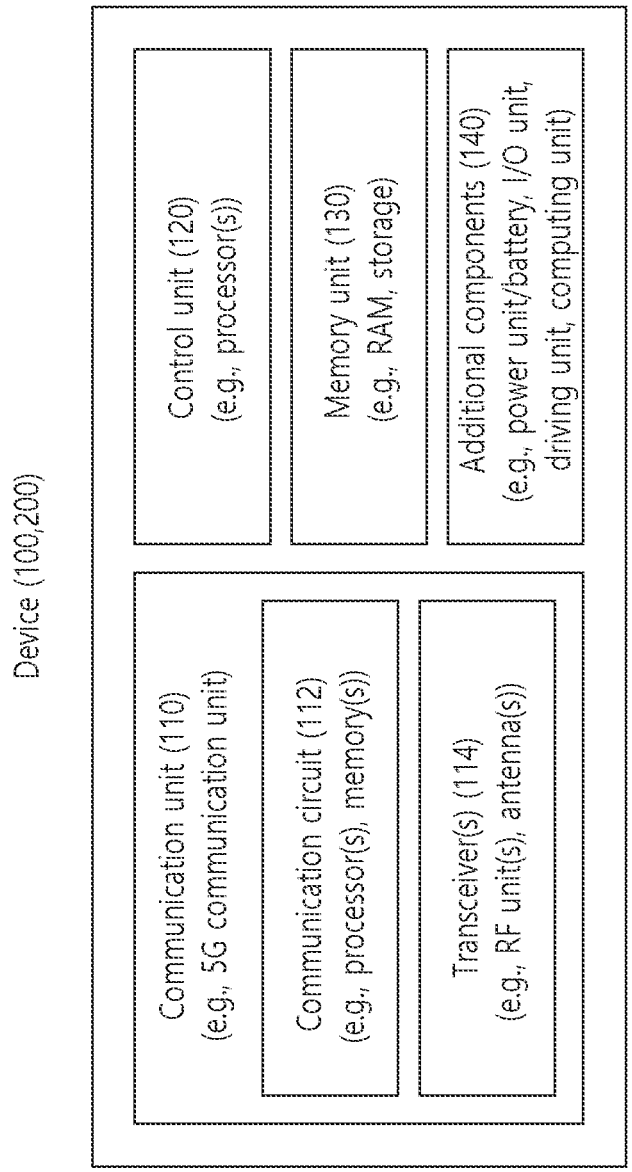
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors.

As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
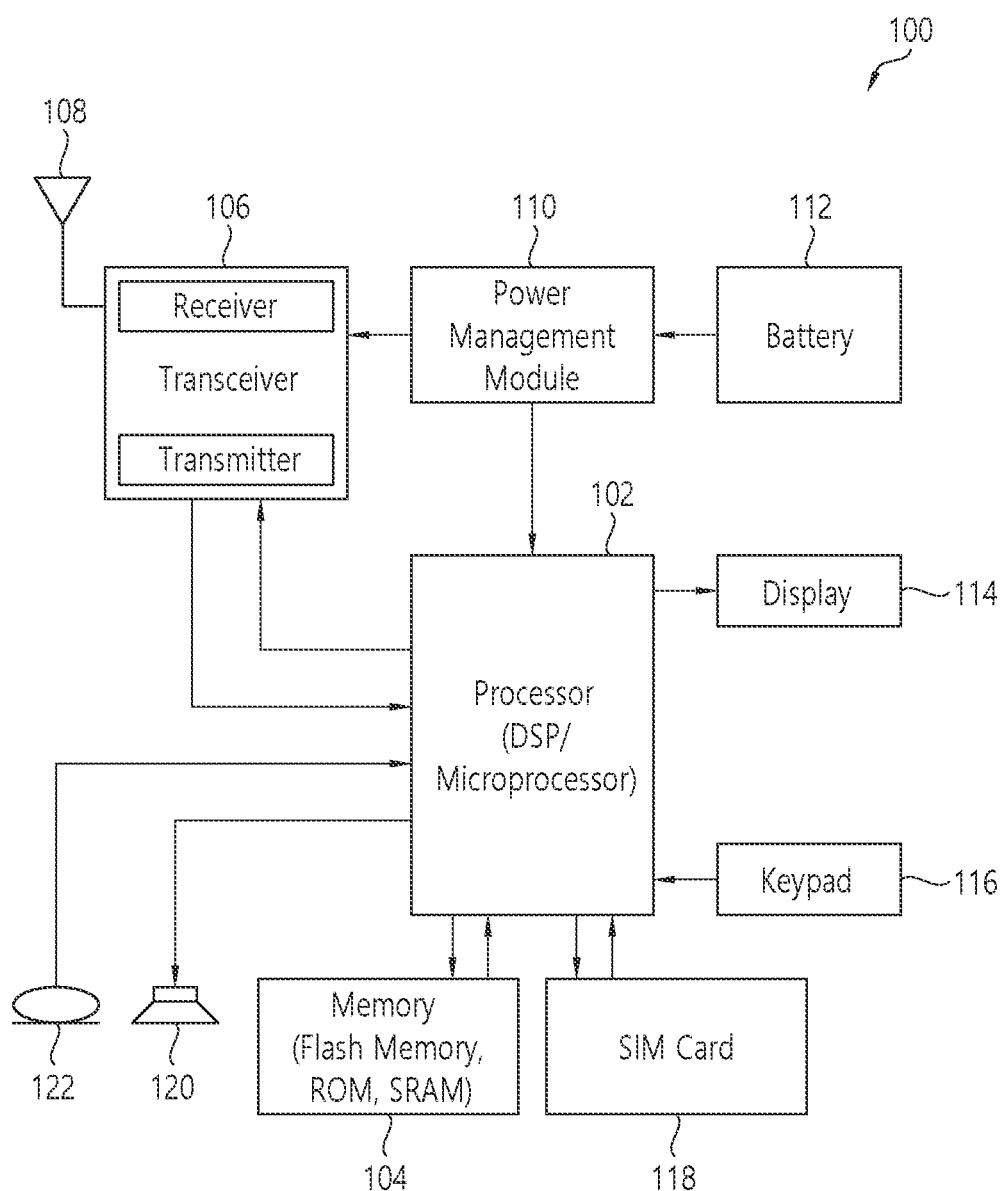
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
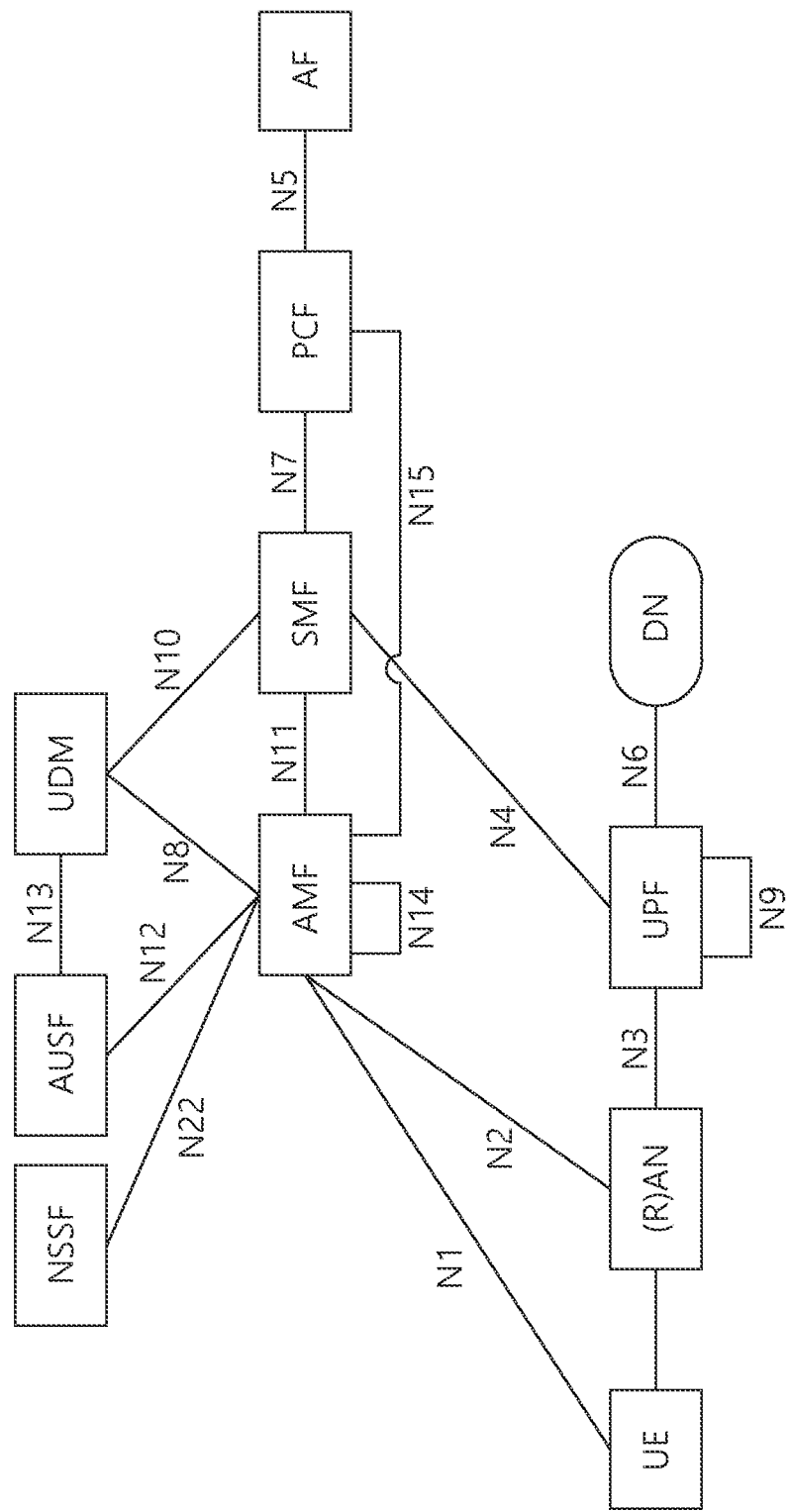
FIG. 5 shows an example of 5G system architecture to which implementations of the present disclosure is applied.

FIG. 5 shows an example of 5G system architecture to which implementations of the present disclosure is applied.

The 5G system (5GS) architecture consists of the following network functions (NF).

Authentication Server Function (AUSF)
Access and Mobility Management Function (AMF)
Data Network (DN), e.g., operator services, Internet access or 3rd party services
Unstructured Data Storage Function (UDSF)
Network Exposure Function (NEF)
Intermediate NEF (I-NEF)
Network Repository Function (NRF)
Network Slice Selection Function (NSSF)
Policy Control Function (PCF)
Session Management Function (SMF)
Unified Data Management (UDM)
Unified Data Repository (UDR)
User Plane Function (UPF)
UE radio Capability Management Function (UCMF)
Application Function (AF)
User Equipment (UE)
(Radio) Access Network ((R)AN)
5G-Equipment Identity Register (5G-EIR)
Network Data Analytics Function (NWDAF)
CHarging Function (CHF)

Emergency call (eCall) is described. Section 4 of 3GPP TS 26.267 V15.0.0 (2018-06) can be referred.

In the description below, the following terms and/or definitions may apply.

AEB: Autonomous emergency braking
AEBS: Advanced emergency braking system, as defined by United Nations Economic Commission for Europe (UN ECE) regulation 131, is considered as a system which can automatically detect a potential forward collision and activate the vehicle braking system to decelerate the vehicle with the purpose of avoiding or mitigating a collision.
CAS: Collision avoidance system, also known as a pre-crash system, forward collision warning system, and/or collision mitigation system, is an automobile safety system designed to prevent or reduce the severity of a collision.
Driving environment: General road vehicle, general road under regional/state/national authority's control or enforcement (e.g., law enforcement)
More civilized driving environment: Driving environment involved with more developed setting, for example, 3D road configuration (e.g., near intersection of freeways with multiple different path ways occupying different altitudes), a certain length of freeway segment containing complex branches involved (e.g., complex ramps, entrance/exist which emergency responder vehicle must obtain very detailed vector/point to go through or reach), automated driving vehicle.

The term "more civilized" against "driving environment" might be different from one generation to another but it is intended to describe more developed environments, as given as examples, such that more detailed design and development of wireless communication technology are expected to properly serve more developed environments for driving.

ACN: Automatic crash/collision notification is an emerging safety technology designed to notify emergency responders that a crash has occurred and provide its location.

AACN: Advanced automatic crash/collision notification, the successor to ACN system, is an emerging safety technology.

Crash and collision are oftentimes used interchangeably.

AIeC: Automatically initiated eCall eCall: A manually or automatically initiated emergency call (TS12) from a vehicle, supplemented with a minimum set of emergency related data (MSD), as defined under the EU Commission's eSafety eSafety: European Commission sponsored forum to improve safety aspects of European citizens.

This can be applied to citizens of any country where this technology is available, MIeC: Manually Initiated eCall MSD: The minimum set of data forming the data component of an eCall sent from a vehicle to a public safety answering point (PSAP) or other designated emergency call center. The MSD has a maximum size of 140 bytes and includes, for example, vehicle identity, location information and time-stamp.

MSD data frame: Uplink signal transmission interval containing the data of one MSD (after synchronization has been established)—corresponds to a time interval of 1320 ms or 10560 samples (fast modulator) and 2320 ms or 18560 samples (robust modulator) assuming an 8 kHz sampling rate.

PCSSF: Pre-crash system (PCS) sensing function

Figure 6:
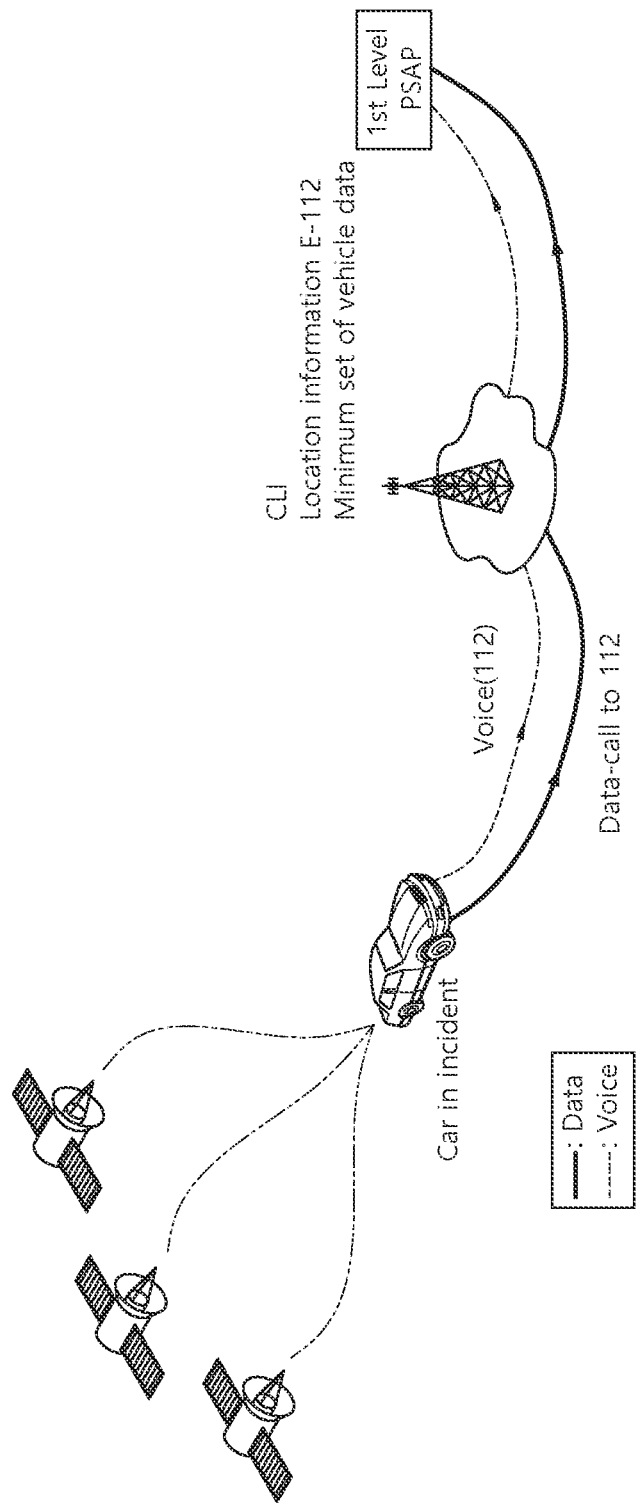
FIG. 6 shows an example of eCall system overview to which implementations of the present disclosure is applied.

FIG. 6 shows an example of eCall system overview to which implementations of the present disclosure is applied.

Referring to FIG. 6, in the event of a vehicle collision, the eCall in-band modem solution is used in an automatically or manually established emergency voice call (E112) from the vehicle (IVS) via the cellular network to the local emergency agencies, i.e., the PSAP. The eCall modem allows to transfer a data message from the IVS over the cellular network to the PSAP which is denoted as eCall MSD. The MSD can include, e.g., vehicle location information, time stamp, number of passengers, vehicle identification number (VIN), and other relevant accident information.

It is expected that the eCall MSD information will be sent either immediately following the establishment of the voice call or at any point later during the voice call. The integrity of the eCall data sent from the vehicle to the PSAP is ensured by the specified modem.

The eCall is a European regional requirement. It shall not have an impact on the global circulation of terminals.

The eCall service requirements have been defined as follows.

The data may be sent prior to, in parallel with, or at the start of the voice component of an emergency call.

Should the PSAP request additional data then this may be possible during the established emergency call.

The realization of the transfer of data during an emergency call shall minimize changes to the originating and transit networks.

Both the voice and data components of the emergency call shall be routed to the same PSAP or designated emergency call center.

The transmission of the data shall be acknowledged and if necessary data shall be retransmitted.

A UE configured only to transfer data during emergency calls (e.g., eCall only UE) shall not generate signaling to the network besides What is needed to place an emergency call.

The UE shall indicate at call setup if the emergency call will carry supplementary data.

The following specific requirements are considered necessary for the satisfactory operation of the eCall service. Additionally, all existing TS12 emergency call requirements shall apply.

An eCall shall consist of a TS12 emergency call supplemented by a minimum set of emergency related data (MSD).

An eCall may be initiated automatically, for example due to a vehicle collision, or manually by the vehicle occupants.

An IVS, or other UE designed to support eCall functionality, shall include in the emergency call set-up an indication that the present call is either a MIeC or an AIeC.

The MSD sent by the IVS to the network shall not exceed 140 bytes.

The MSD should typically be made available to the PSAP within 4 seconds, measured from the time when end to end connection with the PSAP is established.

Should the MSD component not be included in an eCall, or is corrupted or lost for any reason, then this shall not affect the associated TS12 emergency call speech functionality.

A call progress indication shall be provided to the user whilst the MSD transmission is in progress.

To reduce the time taken to establish an eCall an IVS whilst in eCall only mode, may receive network availability information whilst not registered on a public land mobile network (PLMN).

Optionally, PLMNs may make use of eCall indicators, received in the emergency call set-up, to differentiate eCalls from other TS12 emergency calls.

The MIeC and AIeC may be used to filter or route eCalls to a dedicated PSAP operators.

Throughout the duration of the emergency call and following receipt of the MSD by the PSAP It shall be possible for the PSAP to send a confirmation to the IVS that the MSD has been acted upon.

It shall be possible for the PSAP to request the IVS to re-send its most recent MSD.

It shall be possible for the PSAP to instruct the IVS to terminate the eCall.

Figure 7:
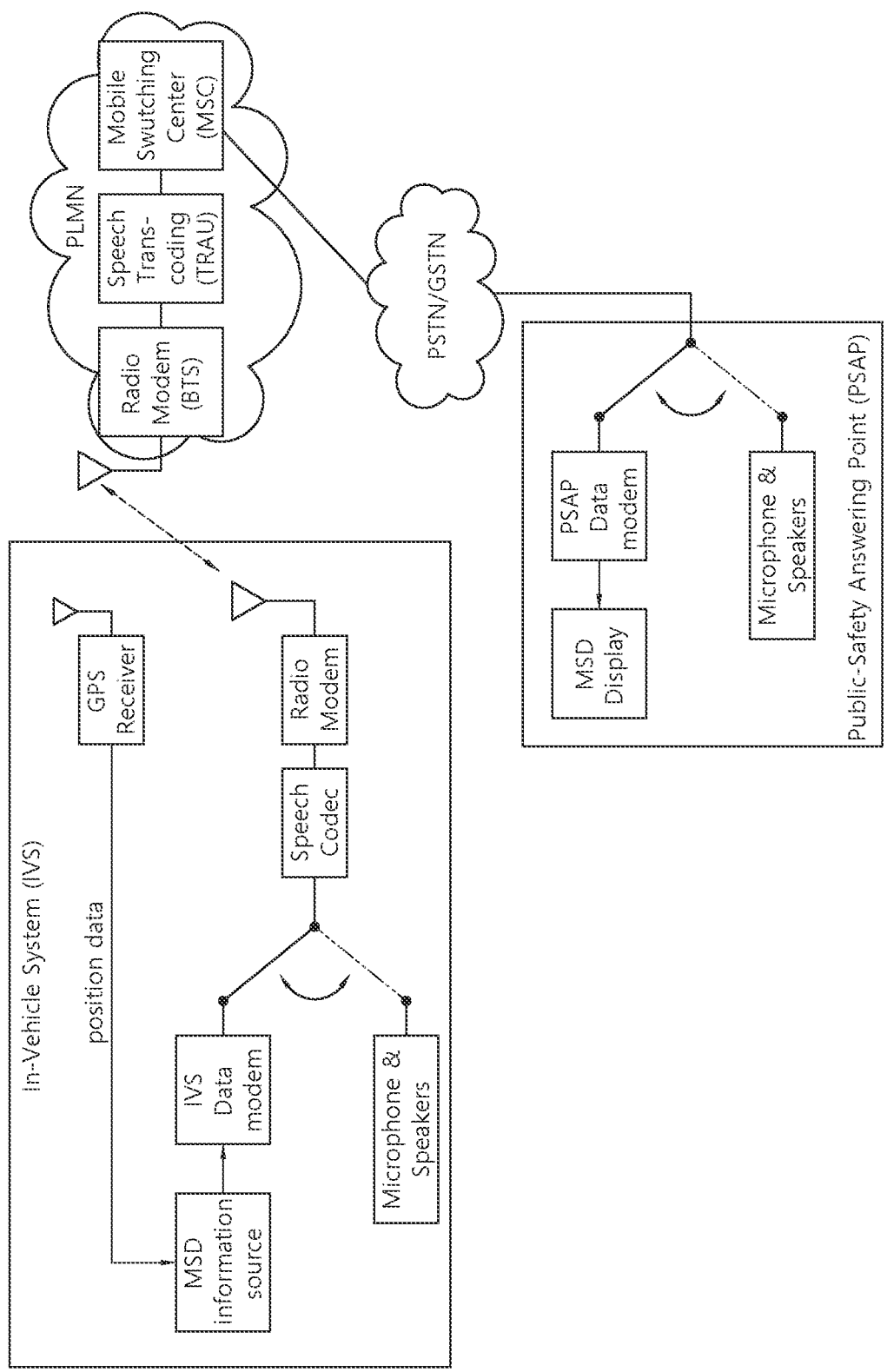
FIG. 7 shows an example of eCall system within the cellular system architecture, including the IVS and PSAP data modems, to which implementations of the present disclosure is applied.

FIG. 7 shows an example of eCall system within the cellular system architecture, including the IVS and PSAP data modems, to which implementations of the present disclosure is applied.

Referring to FIG. 7, after an emergency voice call has been (automatically or manually) established, the IVS modem receiver constantly monitors the incoming signal from the speech decoder output. When prompted by a request from the PSAP operator for MSD, the IVS connects the IVS data modem transmitter to the input of the speech coder and mutes any speech from the motorist for the duration of MSD transmission to prevent it from interfering with the eCall data transmission. Alternatively, it can be the IVS that may trigger the MSD transmission. In this case, the IVS asks the PSAP to request an MSD transmission.

The first operation mode shall be referred to as the pull mode whereas the latter one is the push mode. Essentially, push mode is realized by a request from the IVS to the PSAP to pull the MSD.

The MSD has been standardized by the European Committee for Standardization. In case of incident, the PSAP receives the MSD including the following information (this list is not exhaustive):

Message identifier: MSD format version (later versions to be backwards compatible with existing versions).

Activation: whether the eCall has been manually or automatically generated

Call type: whether the eCall is real emergency or test call

Vehicle type: passenger Vehicle, buses and coaches, light commercial vehicles, heavy duty vehicles, motorcycles Vehicle identification number (VIN)

Vehicle propulsion storage type: This is important particularly relating to fire risk and electrical power source issues (e.g. Gasoline tank, Diesel tank, Compressed natural gas (CNG), etc.)

Time stamp: Timestamp of incident event

Vehicle location: determined by the on-board system at the time of message generation. It is the last known vehicle's position (latitude and longitude)

Confidence in position: this bit is to be set to "Low confidence in position" if the position is not within the limits of +/−150 m with 95% confidence Direction: helpful to determine the carriageway vehicle was using at the moment of the incident Recent vehicle location n (Optional): vehicle's position in (n−1) and (n−2)

Number of passengers (Optional): number of fastened seatbelts

Optional additional data (Optional): in some cases, optional data may be available in the MSD (at the vehicle manufacturer discretion). This data incorporate a tag for the identification in the beginning of the optional data (type and structure identification). This data will be registered and maintained. PSAP will have free access such data registry data.

Figure 8:
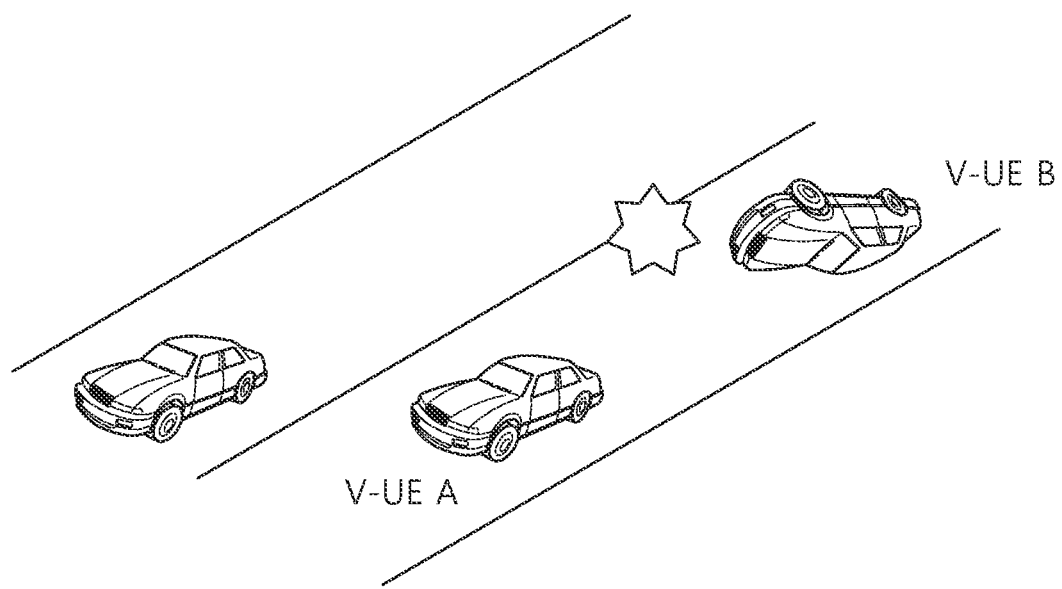
FIG. 8 shows an example of triggering eCall to which implementations of the present disclosure is applied.

FIG. 8 shows an example of triggering eCall to which implementations of the present disclosure is applied.

Referring to FIG. 8, vehicle UE (V-UE) B got an accident that triggered an eCall. A V-UE can get into an accident by itself or with other vehicle(s).

The currently defined method for eCall is based on the assumption that the call making is still possible in the event of accident(s) that might trigger eCall manually or automatically. Also, the MSD is designed to be transferred to the PSAP using in-band communication, which means that the MSD will be transferred combined with voice call.

Therefore, the following problems may arise, and some enhancement for eCall may be proposed in order to improve design of making eCall related to a certain accident.

(1) Can eCall always be made in the event of accident?

(2) Can MSD be transferred to the PSAP reliably?

Particularly, regarding the problem (1) mentioned above, although a vehicle is equipped with cellular vehicle-to-everything (C-V2X)) and/or with eCall, it may always not be possible that the vehicle can initiate automatically or manually. This is because the communication module/equipment deployed within the vehicle for C-V2X and/or eCall can be interrupted and/or destroyed due to various types of damages and/or disturbing factors.

For example, the recent advancement of autonomous vehicle operation has made the vehicle control unit operable with many advanced sensors, including pre-crash sensing or forward collision warning operations, which can potentially reduce the chance of accident to happen or can reduce the level of damage by preparing for some necessary action beforehand. However, although it's not as common, fatal accidents have been reported over the years. This implies that although the control unit is functioning well, there might be mis-sensing of some event(s). Such accidents are not minor accidents, in which the vehicle can get extremely bad damage, including the case of not being able to make communications with other communication nodes (e.g., eNB/gNB or eventually PSAP). In other words, after a fatal crash has already happened, it may be too late to initiate the eCall and send MSD.

Therefore, a method for reliably delivering the MSD and/or supplementary information in case of partial/full failure of the eCall module may be required.

According to implementations of the present disclosure, a protocol may be proposed to allow the PSAP to receive MSD and/or supplementary information/data at the time of partial/full failure of the vehicle's eCall module.

According to implementations of the present disclosure, a pre-eCall procedure may be proposed in which preemptive information/data can be shared based on a precursory indication by using e.g., the input of the PCSSF.

According to implementations of the present disclosure, upon receiving the preemptive information/data (i.e., primary messages), the eNB/gNB/IAB-DU/PSAP(s) may wait for secondary messages. According to the secondary messages indicating positive and/or negative, the eNB/gNB/IAB-DU/PSAP(s) may determine how to interpret the primary messages and/or whether to discard the primary messages or not.

According to implementations of the present disclosure, machine learning (ML) agent may be installed in the PSAP to use statistical characteristics (probability of receiving secondary messages for decision of discarding and/or interpretation of primary messages, probability of receiving positive secondary messages, etc.).

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 9:
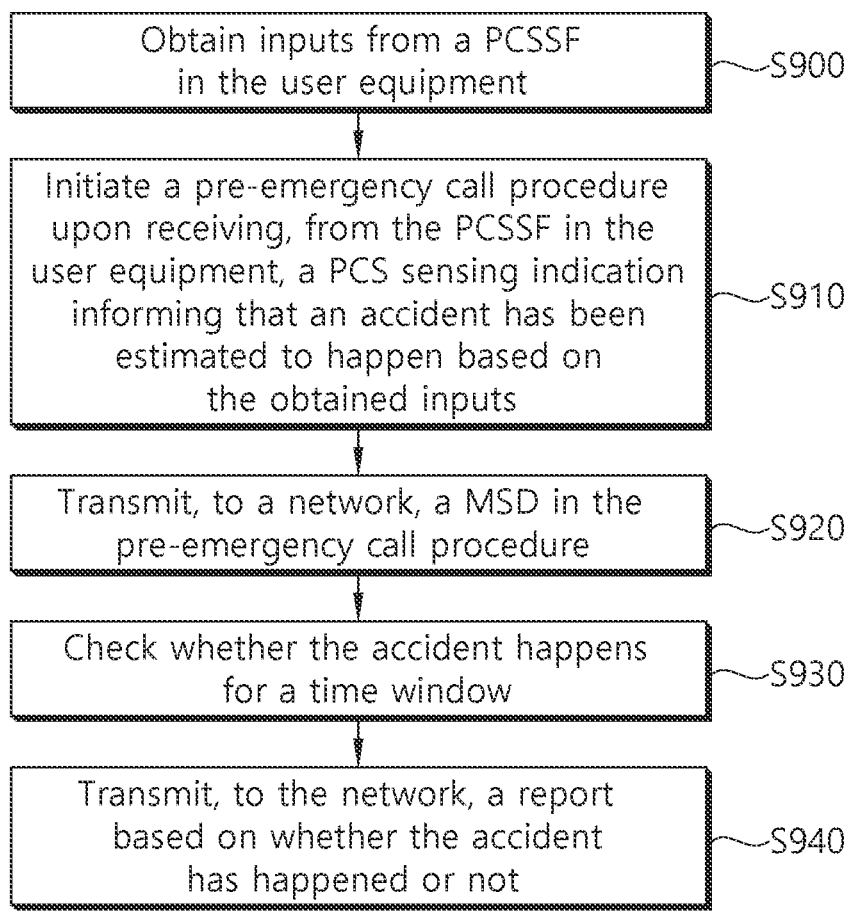
FIG. 9 shows an example of a method performed by a UE to which implementations of the present disclosure is applied.

FIG. 9 shows an example of a method performed by a UE to which implementations of the present disclosure is applied.

In step S900, the UE obtains inputs from a PCSSF in the UE.

In step S910, the UE initiates a pre-emergency call procedure upon receiving, from the PCSSF, a PCS sensing indication informing that an accident has been estimated to happen based on the obtained inputs.

In some implementations, the pre-emergency call procedure may be initiated based on a criterion being met.

In step S920, the UE transmits, to a network, a MSD in the pre-emergency call procedure.

In some implementations, the MSD may be stored in the network.

In step S930, the UE checks whether the accident happens for a time window.

In step S940, the UE transmits, to the network, a report based on whether the accident has happened or not.

In some implementations, the report may be a positive report for the accident based on the accident happening. That is, based on checking whether the accident happens for the time window and if the accident actually happens, the UE may transmit the positive report to the network. Supplementary data and/or information on the accident may be transmitted to the network. Based on the positive report, the initiated/established pre-emergency call may be used as the regular emergency call.

In some implementations, the report may be a negative report indicating that the PCS sensing indication (e.g., estimated information) is not followed by the accident. That is, based on checking whether the accident happens for the time window and if the accident does not actually happen, the UE may transmit the negative report to the network. The stored MSD may be deleted in the network based on reception of the negative report.

In some implementations, the UE may be in communication with at least one of a mobile device, a network, and/or autonomous vehicles other than the UE. Or, the UE may be a service robot.

In some implementations, the network may correspond to a PSAP.

In some implementations, the PCS sensing indication may be a precursory indication.

Furthermore, the method in perspective of the UE described above in FIG. 9 may be performed by the first wireless device 100 shown in FIG. 2, the wireless device 100 shown in FIG. 3, and/or the UE 100 shown in FIG. 4.

More specifically, the UE comprises a PCSSF, at least one transceiver, at least one processor, and at least one computer memory operably connectable to the at least one processor and storing instructions that, based on being executed by the at least one processor, perform operations below.

The operations comprise obtaining inputs from the PCSSF.

The operations comprise initiating a pre-emergency call procedure upon receiving, from the PCSSF, a PCS sensing indication informing that an accident has been estimated to happen based on the obtained inputs.

In some implementations, the pre-emergency call procedure may be initiated based on a criterion being met.

The operations comprise transmitting, to a network via the at least one transceiver, a MSD in the pre-emergency call procedure.

In some implementations, the MSD may be stored in the network.

The operations comprise checking whether the accident happens for a time window.

The operations comprise transmitting, to the network via the at least one transceiver, a report based on whether the accident has happened or not.

In some implementations, the report may be a positive report for the accident based on the accident happening. That is, based on checking whether the accident happens for the time window and if the accident actually happens, the UE may transmit the positive report to the network. Supplementary data and/or information on the accident may be transmitted to the network. Based on the positive report, the initiated/established pre-emergency call may be used as the regular emergency call.

In some implementations, the report may be a negative report indicating that the PCS sensing indication (e.g., estimated information) is not followed by the accident. That is, based on checking whether the accident happens for the time window and if the accident does not actually happen, the UE may transmit the negative report to the network. The stored MSD may be deleted in the network based on reception of the negative report.

In some implementations, the UE may be in communication with at least one of a mobile device, a network, and/or autonomous vehicles other than the UE. Or, the UE may be a service robot.

In some implementations, the network may correspond to a PSAP.

In some implementations, the PCS sensing indication may be a precursory indication.

Furthermore, the method in perspective of the UE described above in FIG. 9 may be performed by control of the processor 102 included in the first wireless device 100 shown in FIG. 2, by control of the communication unit 110 and/or the control unit 120 included in the wireless device 100 shown in FIG. 3, and/or by control of the processor 102 included in the UE 100 shown in FIG. 4.

More specifically, an apparatus operating in a wireless communication system (e.g., UE) comprises at least one processor, and at least one computer memory operably connectable to the at least one processor. The at least one processor is configured to perform operations comprising: obtaining inputs from a PCSSF in the user equipment, initiating a pre-emergency call procedure upon receiving, from the PCSSF, a PCS sensing indication informing that an accident has been estimated to happen based on the obtained inputs; generating a MSD, checking whether the accident happens for a time window, and generating a report based on whether the accident has happened or not.

Furthermore, the method in perspective of the UE described above in FIG. 9 may be performed by a software code 105 stored in the memory 104 included in the first wireless device 100 shown in FIG. 2.

The technical features of the present disclosure may be embodied directly in hardware, in a software executed by a processor, or in a combination of the two. For example, a method performed by a wireless device in a wireless communication may be implemented in hardware, software, firmware, or any combination thereof. For example, a software may reside in RAM, flash memory, ROM, EPROM, EEPROM, registers, hard disk, a removable disk, a CD-ROM, or any other storage medium.

Some example of storage medium may be coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include RAM such as synchronous dynamic random access memory (SDRAM), ROM, non-volatile random access memory (NVRAM), EEPROM, flash memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some implementations of the present disclosure, a non-transitory computer-readable medium (CRM) has stored thereon a plurality of instructions.

More specifically, at least one CRM stores instructions that, based on being executed by at least one processor, perform operations comprising: obtaining inputs from a PCSSF in the user equipment, initiating a pre-emergency call procedure upon receiving, from the PCSSF, a PCS sensing indication informing that an accident has been estimated to happen based on the obtained inputs; generating a MSD, checking whether the accident happens for a time window, and generating a report based on whether the accident has happened or not.

Figure 10:
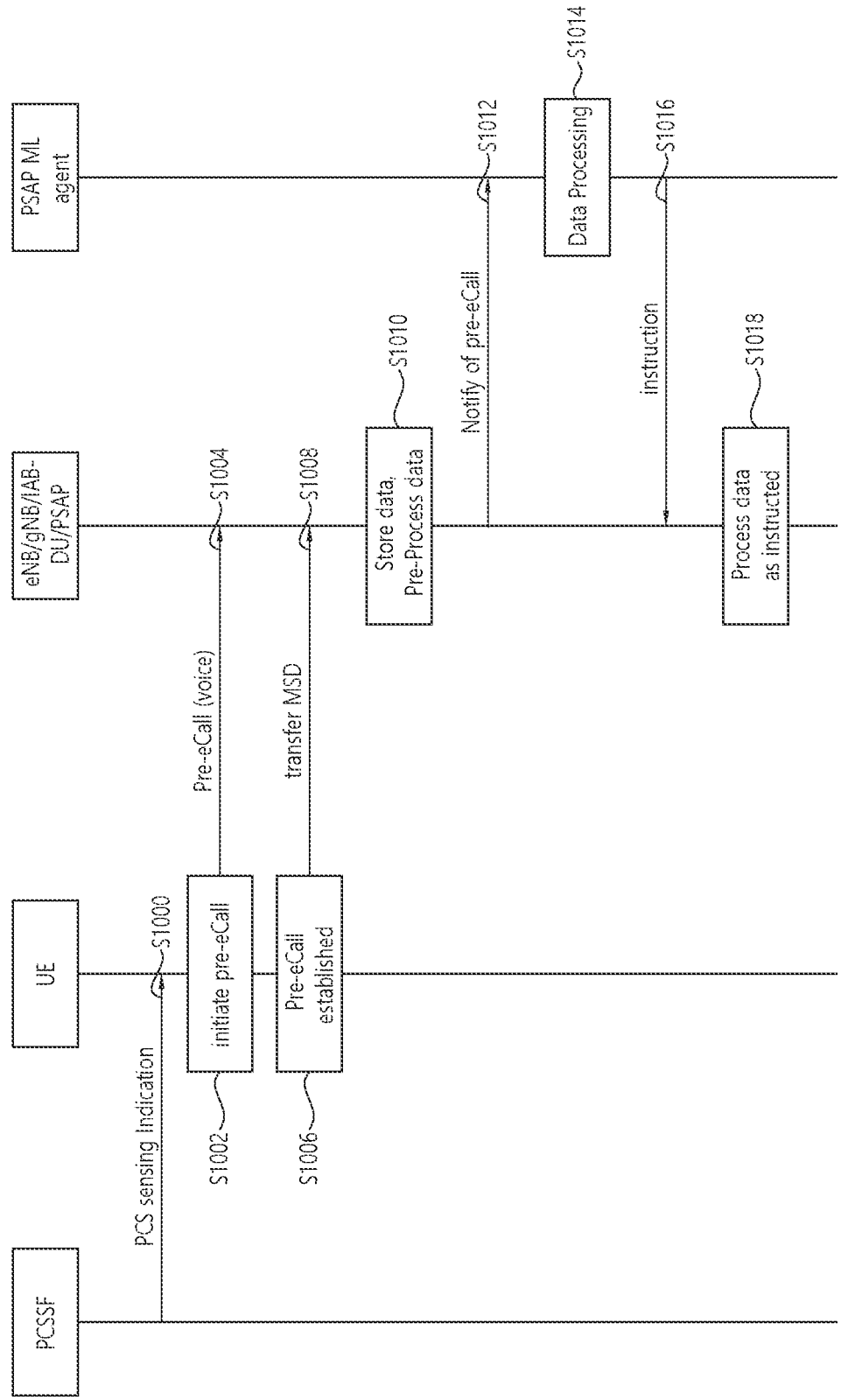
FIGS. 10 and 11 shows an example of a procedure to which implementations of the present disclosure is applied.
Figure 11:
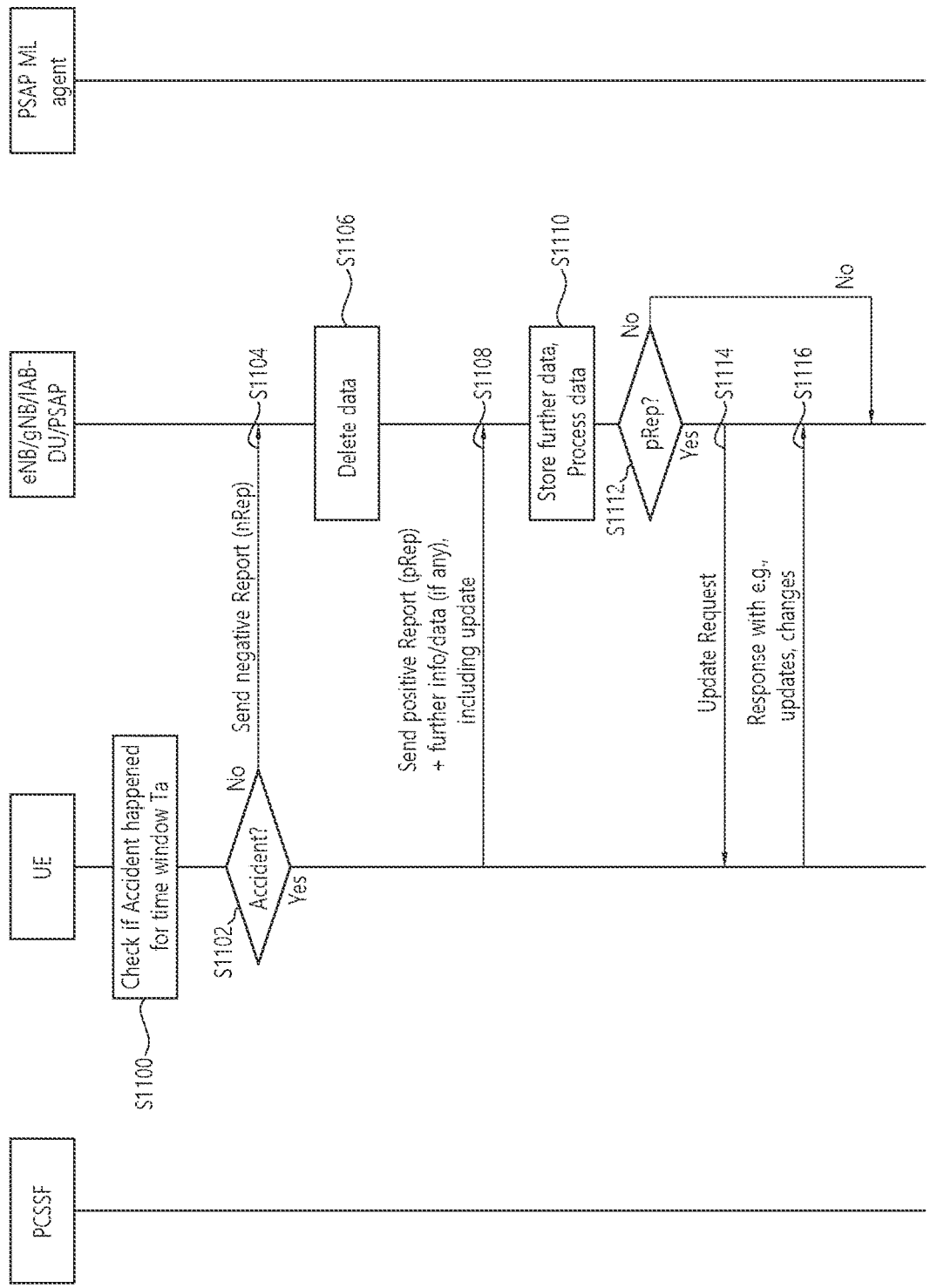

FIGS. 10 and 11 shows an example of a procedure to which implementations of the present disclosure is applied.

First, operations of FIG. 10 are described.

In step S1000, the UE may get input from PCSSF, e.g., PCS sensing indication. This step may happen in advanced, e.g., around T seconds (or milliseconds) before the crash.

In step S1002, the UE may initiate pre-eCall. The pre-eCall is different from the conventional eCall procedure described above referring to FIGS. 6 to 8.

In step S1004, the UE may make pre-eCall to the network, e.g., eNB/gNB/IAB-DU/PSAP.

In step S1006, the pre-eCall may be established.

In step S1008, the UE may transfer MSD via the established pre-eCall to the network, e.g., eNB/gNB/IAB-DU/PSAP.

In step S1010, the network, e.g., eNB/gNB/IAB-DU/PSAP, may store the received MSD, when permitted by agreements or by regional regulations/laws. Furthermore, the network may pre-process the received MSD.

In step S1012, the network, e.g., eNB/gNB/IAB-DU/PSAP, may notify the PSAL ML agent of the pre-eCall for the PSAL ML agent to preform necessary learning operation.

In step S1014, the PSAP ML agent may perform data processing on the received MSD based on the notification of the pre-eCall.

In step S1016, the PSAP ML agent may provide instructions to the network, e.g., eNB/gNB/IAB-DU/PSAP. The instruction may include an indication for the network to start necessary data processing on the received MSD and/or preparation. The instruction may include such indication with a certain value of probability.

In step S1018, the network, e.g., eNB/gNB/IAB-DU/PSAP, may process data on the received MSD as instructed by the PSAP ML agent. Upon receiving from the PSAP ML agent the indication with the certain value of probability, the network, especially the PSAP, may prepare for something based on the known statistics and/or learned pattern/behavior of the pre-eCall. For example, how likely the pre-eCall is linked to a positive report, how likely the pre-eCall is linked in a certain area, in a certain time window of the day, in a certain season, etc., may be learned.

Operations of FIG. 11, which follow the operations of FIG. 10, are described.

In step S1100, the UE may check if an accident associated with the PCSSF sensing indication happens for the pre-determined period of time (e.g., Ta).

If the accident does not actually happen for the time window (e.g., Ta) in step S1102, the UE may transmit a negative report to the network, e.g., eNB/gNB/IAB-DU/PSAP in step S1104. In step S1106, the network, e.g., eNB/gNB/IAB-DU/PSAP, may delete the received MSD.

Alternatively, if the accident actually happens for the time window (e.g., Ta) in step S1102, the UE may transmit a positive report to the network, e.g., eNB/gNB/IAB-DU/PSAP in step S1108. The positive report may be transmitted if communication is still possible for the UE to make. However, if communication is not possible, the UE may not have to send any report to the network.

Along with the positive report, supplementary information/data may be transmitted to the network as well if available. The supplementary information/data may include updated information/data on the accident. In this case, information on the update may be marked in the supplementary information/data before being sent to the network so that the network can identify the received supplementary information/data is update of the previously received information/data (e.g., MSD).

In step S1110, upon receiving the positive report and/or the supplementary information/data, the network, e.g., eNB/gNB/IAB-DU/PSAP, may store the supplementary information/data. The network may process the received supplementary information/data.

In step S1112, the network, e.g., eNB/gNB/IAB-DU/PSAP, may check whether the positive report is received.

If yes, in step S1114, the network, e.g., eNB/gNB/IAB-DU/PSAP, may transmit update request to the UE. In step S1116, in response to the update request, the UE may transmit a response with, e.g., update and/or change of the previously sent information/data, to the network, e.g., eNB/gNB/IAB-DU/PSAP.

Figure 12:
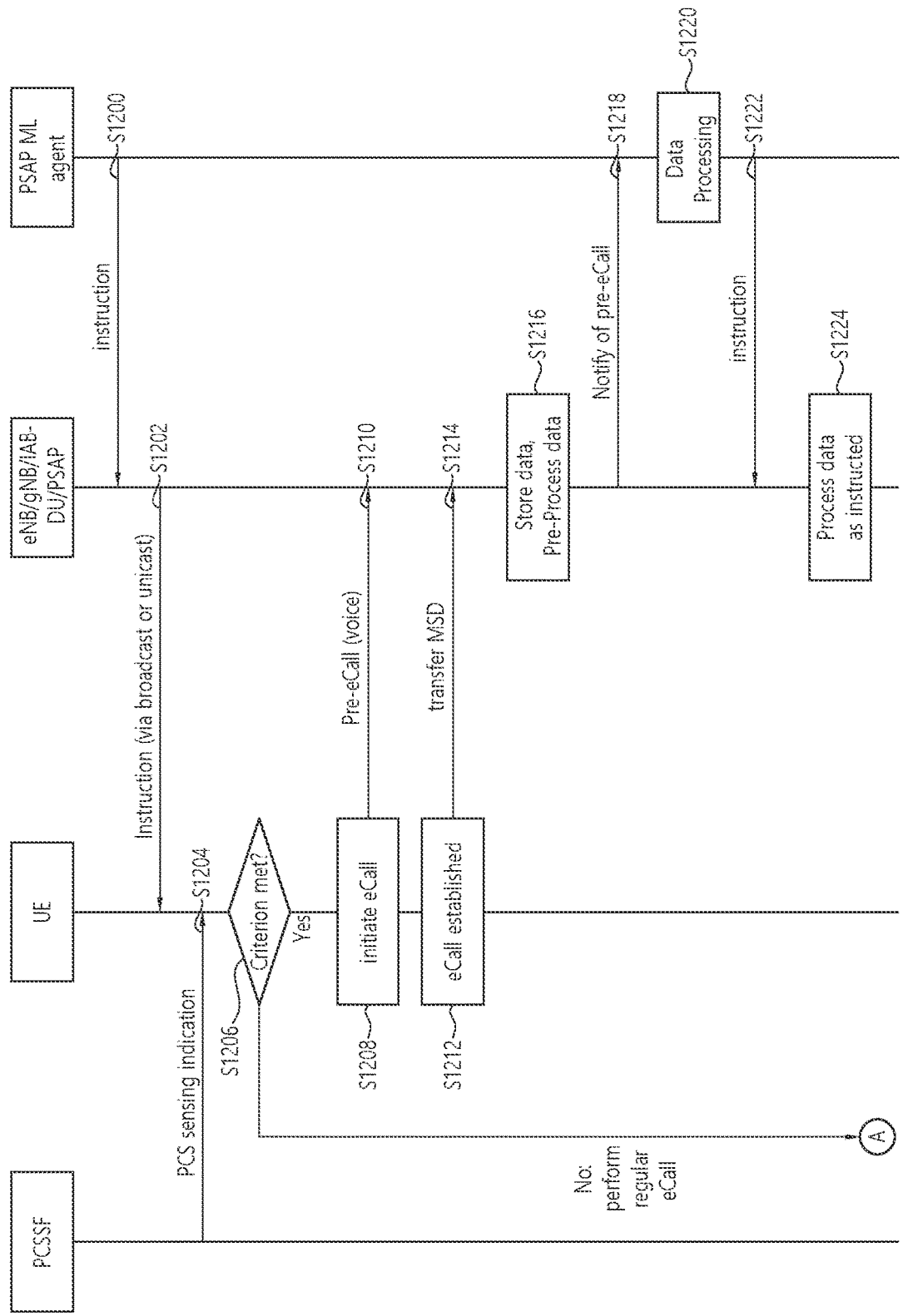
FIGS. 12 and 13 shows another example of a procedure to which implementations of the present disclosure is applied.
Figure 13:
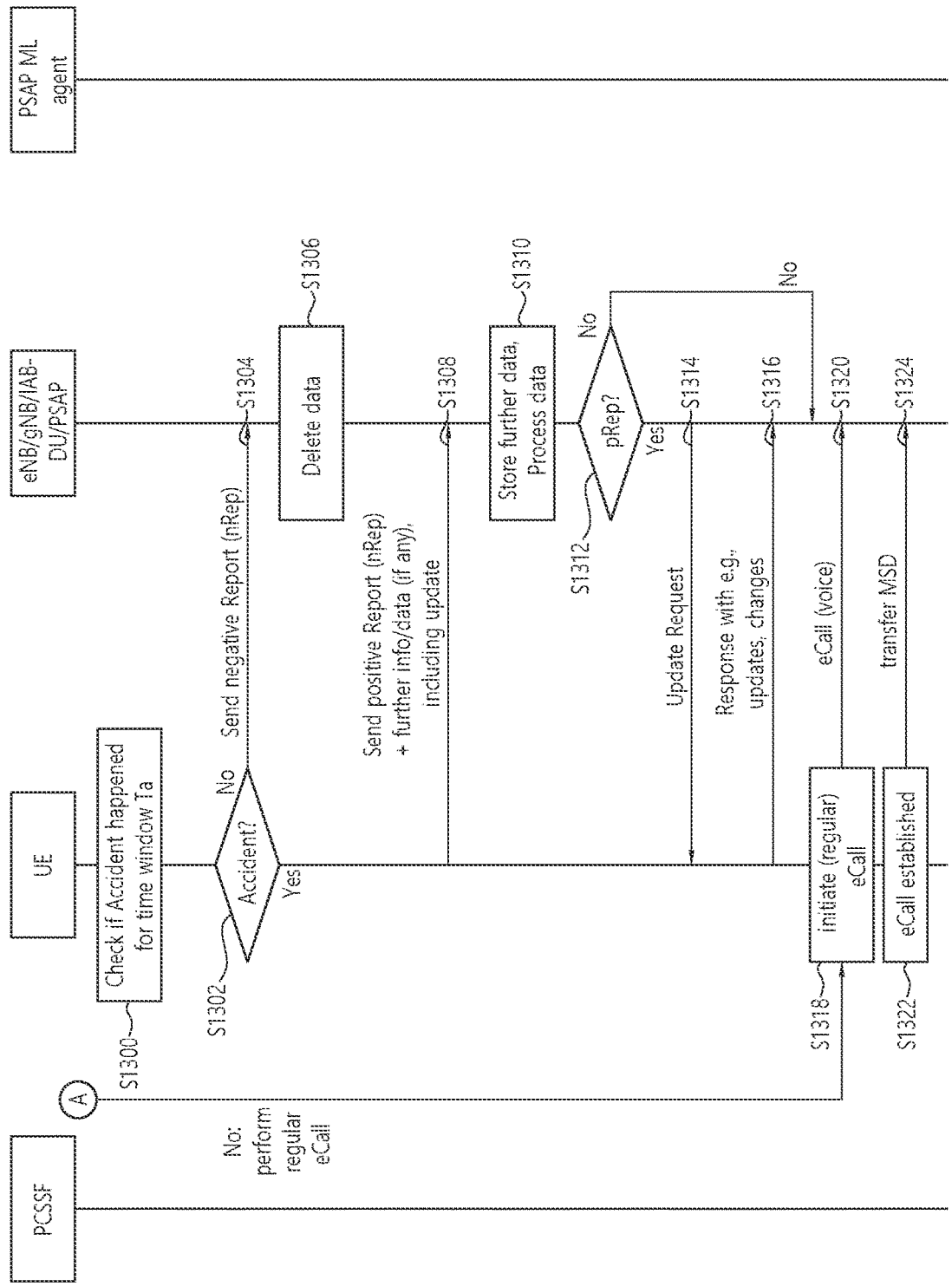

FIGS. 12 and 13 shows another example of a procedure to which implementations of the present disclosure is applied.

The procedure to be described in FIGS. 12 and 13 is inherited from to the procedure described above in FIGS. 10 and 11. Compared to the procedure described above in FIGS. 10 and 11, the procedure to be described in FIGS. 12 and 13 is designed to be more adaptive to the situation by utilizing the learned instructions provided by the network to the UE moving around along a certain area/road in a certain condition (e.g., weather, etc.). The procedure to be described in FIGS. 12 and 13 may alleviate the load of pre-eCalls not all of which will become real accident-related by adaptively utilizing the learned instructions from the network.

First, operations of FIG. 12 are described.

In step S1200, the PSAP ML agent may share the learning-based instruction information to the network, e.g., eNB/gNB/IAB-DU/PSAP.

In step S1202, the network, e.g., eNB/gNB/IAB-DU/PSAP, may deliver the received learning-based instruction information to UEs in a certain areas or on a certain road, under certain conditions.

In step S1204, the UE may get input from PCSSF, e.g., PCS sensing indication. This step may happen in advanced, e.g., around T seconds (or milliseconds) before the crash.

In step S1206, the UE may utilize the received learning-based instruction information to check whether the criterion is met to perform pre-eCall or not. If the criterion is not met, regular (or conventional) eCall procedure may be performed, which will be described in FIG. 13 later.

If the criterion is not met, in step S1208, the UE may initiate pre-eCall. The pre-eCall is different from the conventional eCall procedure described above referring to FIGS. 6 to 8.

In step S1210, the UE may make pre-eCall to the network, e.g., eNB/gNB/IAB-DU/PSAP.

In step S1212, the pre-eCall may be established.

In step S1214, the UE may transfer MSD via the established pre-eCall to the network, e.g., eNB/gNB/IAB-DU/PSAP.

In step S1216, the network, e.g., eNB/gNB/IAB-DU/PSAP, may store the received MSD, when permitted by agreements or by regional regulations/laws. Furthermore, the network may pre-process the received MSD.

In step S1218, the network, e.g., eNB/gNB/IAB-DU/PSAP, may notify the PSAL ML agent of the pre-eCall for the PSAL ML agent to preform necessary learning operation.

In step S1220, the PSAP ML agent may perform data processing on the received MSD based on the notification of the pre-eCall.

In step S1222, the PSAP ML agent may provide instructions to the network, e.g., eNB/gNB/IAB-DU/PSAP. The instruction may include an indication for the network to start necessary data processing on the received MSD and/or preparation. The instruction may include such indication with a certain value of probability.

In step S1224, the network, e.g., eNB/gNB/IAB-DU/PSAP, may process data on the received MSD as instructed by the PSAP ML agent. Upon receiving from the PSAP ML agent the indication with the certain value of probability, the network, especially the PSAP, may prepare for something based on the known statistics and/or learned pattern/behavior of the pre-eCall. For example, how likely the pre-eCall is linked to a positive report, how likely the pre-eCall is linked in a certain area, in a certain time window of the day, in a certain season, etc., may be learned.

Operations of FIG. 13, which follow the operations of FIG. 12, are described.

In step S1300, the UE may check if an accident associated with the PCSSF sensing indication happens for the predetermined period of time (e.g., Ta).

If the accident does not actually happen for the time window (e.g., Ta) in step S1302, the UE may transmit a negative report to the network, e.g., eNB/gNB/IAB-DU/PSAP in step S1304.

In step S1306, the network, e.g., eNB/gNB/IAB-DU/PSAP, may delete the received MSD.

Alternatively, if the accident actually happens for the time window e.g., Ta) in step S1302, the UE may transmit a positive report to the network, e.g., eNB/gNB/IAB-DU/PSAP in step S1308. The positive report may be transmitted if communication is still possible for the UE to make. However, if communication is not possible, the UE may not have to send any report to the network.

Along with the positive report, supplementary information/data may be transmitted to the network as well if available. The supplementary information/data may include updated information/data on the accident. In this case, information on the update may be marked in the supplementary information/data before being sent to the network so that the network can identify the received supplementary information/data is update of the previously received information/data (e.g., MSD).

In step S1310, upon receiving the positive report and/or the supplementary information/data, the network, e.g., eNB/gNB/IAB-DU/PSAP, may store the supplementary information/data. The network may process the received supplementary information/data.

In step S1312, the network, e.g., eNB/gNB/IAB-DU/PSAP, may check whether the positive report is received.

If yes, in step S1314, the network, e.g., eNB/gNB/IAB-DU/PSAP, may transmit update request to the UE. In step S1316, in response to the update request, the UTE may transmit a response with, e.g., update and/or change of the previously sent information/data, to the network, e.g., eNB/gNB/IAB-DU/PSAP.

If the criterion is not met in step S1206 of FIG. 12, the UE may initiate regular (or conventional) eCall in step S1318. In step S1320, the UE may make eCall to the network, eNB/gNB/IAB-DU/PSAP.

In step S1322, the eCall may be established. In step S1324, the UE may transfer MSD via the established eCall to the network, e.g., eNB/gNB/IAB-DU/PSAP.

Figure 14:
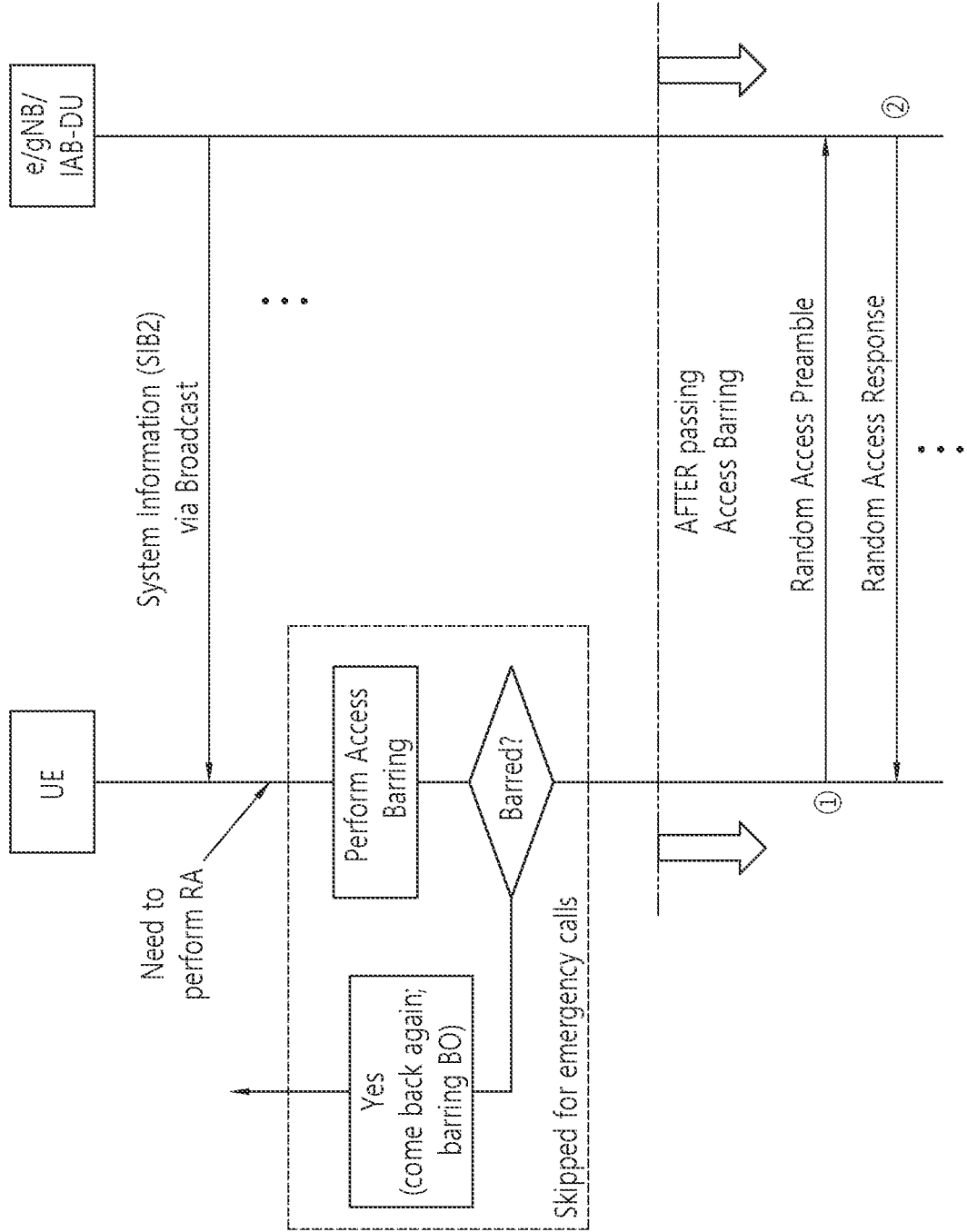
FIG. 14 shows an example of random access and access class barring.

FIG. 14 shows an example of random access and access class barring.

For eCall including conventional eCall and/or pre-eCall, it may be allowed to skip access barring check shown in FIG. 14.

Figure 15:
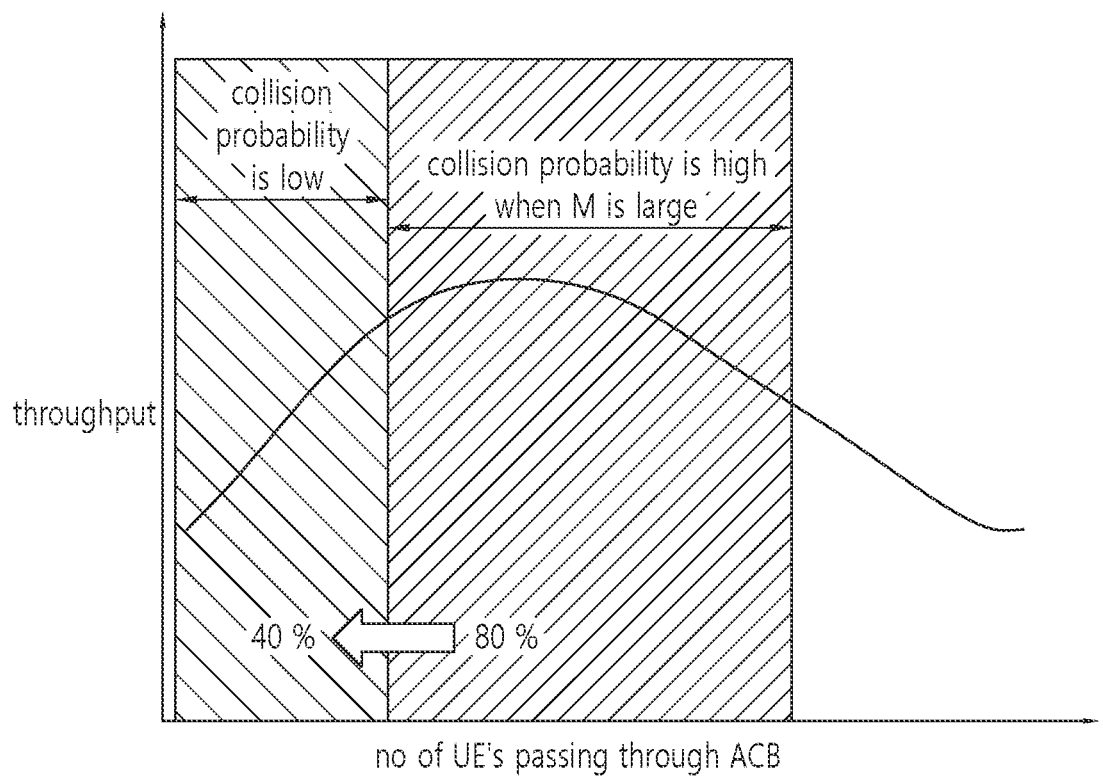
FIG. 15 shows an example of throughput versus the number of UE's that passed access class barring (ACB) in which those UEs experience a certain probability of collision avoidance/success to which implementations of the present application.

FIG. 15 shows an example of throughput versus the number of UE's that passed access class barring (ACB) in which those UEs experience a certain probability of collision avoidance/success to which implementations of the present application.

In FIG. 15, "M" is the total number of UE's before the step of ACB. Referring to FIG. 15, it can be seen that if the learning-based instruction is properly utilized by UE, the success ratio can be improved as the unnecessary random access load can be suitably reduced (e.g., from 80% to 40%).

The present disclosure may have various advantageous effects.

For example, the MSD and/or supplementary information can be reliably delivered to the PSAP during partial/full failure of the eCall module.

For example, a precursory indication can be indicated in case of service robots.

Advantageous effects which can be obtained through specific embodiments of the present disclosure are not limited to the advantageous effects listed above. For example, there may be a variety of technical effects that a person having ordinary skill in the related art can understand and; or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:
    before an accident actually happens:
    i) obtaining inputs from a pre-crash system (PCS) sensing function (PCSSF) in a user equipment;
    ii) initiating a pre-emergency call procedure upon receiving, a PCS sensing indication from the PCSSF, wherein the PCS sensing indication informs that the accident has been estimated to happen based on the obtained inputs; and
    iii) transferring a minimum set of data (MSD) to a network via an established pre-emergency call;
    checking whether the accident happens for a time window;
    transmitting a positive report to the network based on the accident actually having happened; and
    transmitting a negative report to the network based on the accident not actually having happened, wherein the negative report informs that the PCS sensing indication is not followed by the accident.

2. The method of claim 1, wherein the MSD is stored in the network.

3. The method of claim 1, wherein supplementary data and/or information on the accident is transmitted to the network.

4. The method of claim 1, wherein the stored MSD is deleted in the network based on reception of the negative report.

5. The method of claim 1, wherein the pre-emergency call procedure is initiated based on a criterion being met.

6. The method of claim 1, wherein the network corresponds to a public safety answering point (PSAP).

7. The method of claim 1, wherein the PCS sensing indication is a precursory indication.

8. The method of claim 1, wherein the user equipment is in communication with at least one of a mobile device, a network, and/or autonomous vehicles other than the user equipment.

9. A user equipment comprising:
a pre-crash system (PCS) sensing function (PCSSF);
at least one transceiver;
at least one processor; and
at least one computer memory operably connectable to the at least one processor and storing instructions that, based on being executed by the at least one processor, perform operations comprising:
before an accident actually happens:
i) obtaining inputs from the PCSSF;
ii) initiating a pre-emergency call procedure upon receiving a PCS sensing indication from the PCSSF, wherein the PCS sensing indication informs that the accident has been estimated to happen based on the obtained inputs; and
iii) transferring, via the at least one transceiver, a minimum set of data (MSD) to a network via an established pre-emergency call;
checking whether the accident happens for a time window;
transmitting, via the at least one transceiver, a positive report to the network based on the accident actually having happened; and
transmitting, via the at least one transceiver, a negative report to the network based on the accident not actually having happened, wherein the negative report informs that the PCS sensing indication is not followed by the accident.

10. The user equipment of claim 9, wherein the network corresponds to a public safety answering point (PSAP).

11. A processing apparatus adapted to control a user equipment, the processing apparatus comprising:
at least one processor; and
at least one computer memory operably connectable to the at least one processor,
wherein the at least one processor is configured to perform operations comprising:
before an accident actually happens:
i) obtaining inputs from a pre-crash system (PCS) sensing function (PCSSF) in the user equipment;
ii) initiating a pre-emergency call procedure upon receiving a PCS sensing indication from the PCSSF, wherein the PCS sensing indication informs that the accident has been estimated to happen based on the obtained inputs; and
iii) generating a minimum set of data (MSD);
checking whether the accident happens for a time window; and
generating a positive report based on the accident actually having happened; and
generating a negative report based on the accident not actually having happened, wherein the negative report informs that the PCS sensing indication is not followed by the accident.

* * * * *